(12) United States Patent
Yano et al.

(10) Patent No.: US 6,501,789 B2
(45) Date of Patent: Dec. 31, 2002

(54) CDMA RECEIVING APPARATUS

(75) Inventors: Tetsuya Yano, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 09/792,820

(22) Filed: Feb. 23, 2001

(65) Prior Publication Data

US 2001/0053178 A1 Dec. 20, 2001

(30) Foreign Application Priority Data

Jun. 14, 2000 (JP) ........................................ 2000-178216

(51) Int. Cl.[7] ................................................ H04L 1/02
(52) U.S. Cl. ...................................... 375/150; 370/320
(58) Field of Search ................................ 375/150, 147, 375/144, 260, 267, 316, 343; 370/320, 335, 342, 441; 445/504

(56) References Cited

U.S. PATENT DOCUMENTS

| | | | | |
|---|---|---|---|---|
| 5,546,424 A | * | 8/1996 | Miyake ....................... | 375/141 |
| 5,940,428 A | * | 8/1999 | Ishiguro et al. ............. | 370/342 |
| 6,108,369 A | * | 8/2000 | Ovesjo et al. ............... | 375/146 |
| 6,208,684 B1 | * | 3/2001 | Yellin et al. ................ | 375/144 |

FOREIGN PATENT DOCUMENTS

JP 2000216703 8/2000

\* cited by examiner

*Primary Examiner*—Chi Pham
*Assistant Examiner*—Khanh Cong Tran
(74) *Attorney, Agent, or Firm*—Katten, Muchin, Zavis Rosenman

(57) ABSTRACT

Disclosed herein is a receiving apparatus in a CDMA communication system for transmitting a transmit data subjected to a spread modulation processing with a predetermined spreading factor, and demodulating the transmit data by subjecting received signals to a despread processing. A first despread signal generator multiplies a received signal by the same code as a spreading code on the transmission side for each chip, divides the results of multiplications for all the chips into a plurality of groups, and sums the results of multiplications in each group so as to output respectively a despread signal having a spreading factor which is smaller than the spreading factor on the transmission side. A second despread signal generator sums respective k pair of the despread signals which are output from the first despread signal generator so as to generate a plurality of despread signals having a predetermined spreading factor. A bit error rate estimator judges whether the transmit data is "0" or "1" from each of the plurality of despread signals in a predetermined spreading factor, and estimates a bit error rate BER in the predetermined spreading factor by using the results of judgments.

9 Claims, 13 Drawing Sheets

CDMA RECEIVING APPARATUS

BACKGROUND OF THE INVENTION

The present invention relates to a CDMA receiving apparatus in a CDMA communication system for transmitting a transmit data which are subjected to a spread modulation processing with a predetermined spreading factor and demodulating the transmit data by subjecting the received signal to a despread processing and, more particularly, to a CDMA receiving apparatus provided with a function of estimating the error rate in a plurality of energy power ratios Eb/N0s which are lower than the Eb/N0 in the current communication.

As a modulation system in mobile communication, digital systems are now mainly used in place of the conventionally used analog systems. Analog cellular systems are generally called a first generation, while digital cellular systems such as PDC (Japanese standard), GSM (European standard), IS54 (US TDMA standard) and IS95 (US CDMA standard) are called a second generation. The systems of the first and second generations are mainly used for voice service, and effectively utilize limited radio bands for communication by making the most use of the analog/digital narrow-band modulation demodulation system.

In a next generation, however, not only telephone communication but communication through a FAX and an electric mail, and communication of inter-computer etc. are possible. In a next generation, therefore, there is a demand for a communication system which enables service of various types of information (multimedia information) such as a motion picture and a still picture in addition to sound and information through the above-described communication means, and which has such a high quality that a user is not aware that communication is performed in a mobile network. A DS-CDMA (direct sequence code division multiple access) system attracts attention as a promising radio access system which will satisfy the above-described demand. The DS-CDMA system is a system for realizing spread spectrum by directly multiplying the signal which is to be spread its spectrum by a signal in a much wider band.

FIG. 12 shows the structure of a CDMA transmitter in a mobile station. In a pilot channel signals are subjected to a BPSK modulation processing by a first modulator $1a$ and thereafter spread and modulated with a spreading code for the pilot channel by a first spreader $1b$. On the other hand, in a data channel, after signals are subjected to an appropriate coding processing such as CRC coding and convolutional coding by an encoder $1c$, they are subjected to a BPSK modulation processing by a second modulator $1d$, and then spread and modulated with a spreading code for the data channel by a second spreader $1e$. A multiplexer $1f$ combines these signals spread by the first and second spreaders $1b$ and $1e$, respectively, into a vector. The combined signals are then mapped in I channel and Q channel In-phase channel and Quadrature channel which are orthogonal to each other, subjected to frequency conversion and high-frequency amplification by a radio transmitter $1g$, and transmitted from an antenna $1h$.

FIG. 13 shows the structure of a CDMA receiving unit for 1 channel in a CDMA receiver at a base station. A radio receiver $2a$ converts the frequency of the high-frequency signal received from an antenna into the frequency of baseband signals, and inputs the baseband signals into a searcher $2b$ and each of finger portions $2c_1$ to $2c_n$. When the direct sequence signal (DS signal) which is influenced by the multi paths are input, the searcher $2b$ detects the multi paths by autocorrelation using a matched filter (not shown), and inputs the timing data for starting despread and delayed time adjusting data in each path into each of the finger portions $2c_1$ to $2c_n$. A despreader $3a$ in the pilot channel of each of the finger portions $2c_1$ to $2c_n$ subjects the direct wave or delayed wave which arrives through a predetermined path to a despread processing by using the same code as the spreading code in the pilot channel, integrates the result of the despread processing, thereafter subjects the integrated signal to a delay processing corresponding to its own path, and outputs a pilot channel signal. A despreader $3b$ in the data channel of each finger portion subjects the direct wave or delayed wave which arrives through a predetermined path to a despread processing by using the same code as the spreading code in the data channel, integrates the result of the despread processing, thereafter subjects the integrated signal to a delay processing corresponding to its own path, and outputs a data channel signal.

A channel estimating portion $3c$ estimates a channel for compensating for the influence of fading in a communication path by using the despread pilot channel signal, and outputs a channel estimation signal. A fading compensator $3d$ compensates for the fading of the despread data channel signal by using the channel estimation signal. A RAKE combiner $2d$ combines the signal output from each of the finger portions $2c_1$ to $2c_n$, and outputs the combined signals to a decoder $2e$ for soft decision error correction as a soft decision data train. The decoder $2e$ decodes and outputs the transmitted data by soft decision error correction, and inputs the decoded data into an encoder $2f$. The encoder $2f$ subjects the decoded data with an error corrected to the same encoding processing as the encoder $1c$ (FIG. 12) in the transmitter, and a error rate estimator $2g$ estimates a bit error rate BER by comparing the result of encoding with the data before decoding. The bit error rate BER is usable for the control of transmission power.

FIG. 14 is an explanatory view of the transmission power control in a closed loop of an uplink. In a mobile station 1, a spread modulator $1_1$ spreads and modulates a transmit data by using a spreading code which corresponds to a predetermined channel designated by a base station 2, and a power amplifier $1_2$ amplifies the input signal which is subjected to a processing such as orthogonal modulation and frequency conversion after the spread modulation, and transmits the amplified signal from an antenna to the base station 2. In the base station 2, a despreader $2_1$ which corresponds to each path subjects a delayed signal which arrives through an allocated path to a despead modulation processing, and a RAKE combiner/demodulator $2_2$ combines the signal output from each finger.

An Eb/N0 measuring portion $2_3$ measures the ratio Eb/N0 which is the ratio of the signal energy per bit Eb to the noise power N0 of a received signal. A comparator $2_4$ compares the target Eb/N0 with the measured Eb/N0 and if the measured Eb/N0 is larger than the target Eb/N0, it creates a command for lowering the transmission power by TPC (Transmission Power Control) bits, while if the measured Eb/N0 is smaller than the target one, it creates a command for raising the transmission power by TPC bits. The target Eb/N0 is a value necessary for obtaining a bit error rate BER of, for example, $10_{-3}$ (an error occurs once in 1000 times), and it is input into the comparator $2_4$ from a target Eb/N0 setting portion $2_5$. A spread modulator $2_6$ spreads and modulates the transmit data and the TPC bits. After the spread modulation, the base station 2 subjects them to processing such as DA conversion, orthogonal modulation, frequency conversion and power amplification, and transmits them from the antenna to the mobile station 1. A despreader $1_3$ in the mobile station 1 subjects the signal received from the base station 2 to a despread processing, and a RAKE combiner/demodulator $1_4$ decodes the received data and the TPC bits and controls the transmission power of the power amplifier $1_2$ in accordance with the command designated by the TPC bits. The mobile station 1 and the base station 2 perform the above-described power control in every slot.

In the above-described transmission power control, it is necessary to determine and set the target Eb/N0 in such a manner as to obtain a bit error rate BER of, for example, $10_{-3}$. If a communication environment is bad, for example, it is necessary to set the target Eb/N0 at a large value in order to obtain a desired bit error rate BER. On the other hand, if the communication environment is good, it is possible to obtain a desired bit error rate BER even if the target Eb/N0 is small. It is therefore necessary to measure the present communication environment, and set the target Eb/N0 in such a manner as to obtain the desired bit error rate. In the prior art, however, it is unfavorably difficult to measure the communication environment and set the target Eb/N0 in such a manner as to obtain the desired bit error rate in a short time.

Furthermore, in the prior art, it is necessary to control the transmission power so that the measured Eb/N0 equals to the target Eb/N0 so as to obtain a desired bit error rate. In the prior art, however, the measured Eb/N0 is compared with the target Eb/N0 and the transmission power is controlled by predetermined quantity using TPC bits in accordance with the result of the comparison. For this reason, it inconveniently takes a long time to obtain the target Eb/N0, in other words, a desired bit error rate.

In addition, although it is necessary to report the bit error rate BER in the current Eb/N0 to a host apparatus in transmission power control, it is impossible to estimate the bit error rate BER in the current Eb/N0 in a short time.

SUMMARY OF THE INVENTION

Accordingly, it is an object of the present invention to eliminate the above-described problems in the related art, and to set a target Eb/N0 which achieves a desired bit error rate in a short time.

It is another object of the present invention to reduce a control time which is required in order to obtain a desired bit error rate in transmission power control.

It is still another object of the present invention to estimate a bit error rate in a predetermined Eb/N0 in a short time.

To achieve the above-described objects, in the present invention, there is provided a CDMA apparatus comprising: (1) a first despread signal generator for multiplying a received signal by the same code as a spreading code on the transmission side in every chip, dividing the results of the multiplications in all the chips into a plurality of groups, and summing the results of the multiplications in each group so as to output a plurality of despread signals having a smaller spreading factor than the spreading factor on the transmission side; (2) a second despread signal generator for generating despread signals of a predetermined spreading factor by summing every k despread signals out of the plurality of despread signals output from the first despread signal generator, and (3) an error rate estimator for estimating a bit error rate in each spreading factor by judging the transmit data from each of said despread signals in each spreading factor. If the spreading factor becomes ½, the energy Eb per bit becomes ½, so that the Eb/N0 decreases by 3 dB. If the spreading factor becomes ¼, the Eb/N0 decreases by 6 dB, if the spreading factor becomes ⅛, the Eb/N0 decreases by 9 dB and the same rule applies correspondingly to the following. Accordingly, the error rate estimator is able to estimate the error rates in Eb/N0s which are lower than the Eb/N0 in the current communication on the basis of the error rate judged in each spreading factor.

To state this concretely, (1) when the first despread signal generator divides the results of the multiplications of the spreading code and received signals for all the chips into $2^n$ groups, it sums the results of the multiplications in all the chips each group, and outputs a plurality of despread signals having a spreading factor of $SF/2^n$, wherein SF is the spreading factor on the transmission side, (2) the second despread signal generator sums $2^m$ ($m \leq n$) despread signals out of the plurality of despread signals output from the first despread signal generator, and outputs despread signals having a spreading factor of $S/2^{(n-m)}$, wherein m is variable so that the second despread signal generator outputs despread signals having various spreading factor, and (3) the error rate estimator judges the transmit data in each bit from each despread signal and estimates the bit error rate in each spreading factor by using the result of the judgment.

In this manner, the error rate estimator is able to count the frequency of errors in each spreading factor (in other words, the frequency of errors in each Eb/N0) in one despread processing for decoding one bit data, and to estimate the bit error rate BER in each spreading factor by accumulating the frequencies of errors during a predetermined time. It is therefore possible to estimate the error rates in a plurality of Eb/N0s which are smaller than the Eb/N0 in the current communication in a short time, and to decide and set the target Eb/N0 which produces a desired bit error rate by interpolation using these plurality of error rates. In addition, since the target Eb/N0 which produces a desired bit error rate is confirmed in a short time, it is possible to obtain a desired bit error rate in a short time by immediately controlling the transmission power so that the actual Eb/N0 equals to the target Eb/N0.

Furthermore, it is possible to calculate the error rate in the Eb/N0 in the current communication by interpolation from the error rates in a plurality of Eb/N0s which are lower than the Eb/N0 in the current communication, and to report the error rate in the Eb/N0 in the current communication to a host apparatus in a short time.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Entire Structure of a CDMA Receiving Apparatus FIG. 1 shows the entire structure of a CDMA receiving apparatus according to the present invention. The structure of the elements from an antenna to a RAKE combiner is approximately the same as that in the prior art shown in FIG. 13, and the same reference numerals are provides for these elements. What is different in the present invention is that a despreader $3b'$ in a data channel has the structure shown in FIG. 2, and that it outputs a despread signal having a spreading factor SF of 4 on the transmission side. Additionally, the despreader $3b$ in the prior art outputs a despread signal having a spreading factor of SF of 32 on the transmission side.

Figure 1:
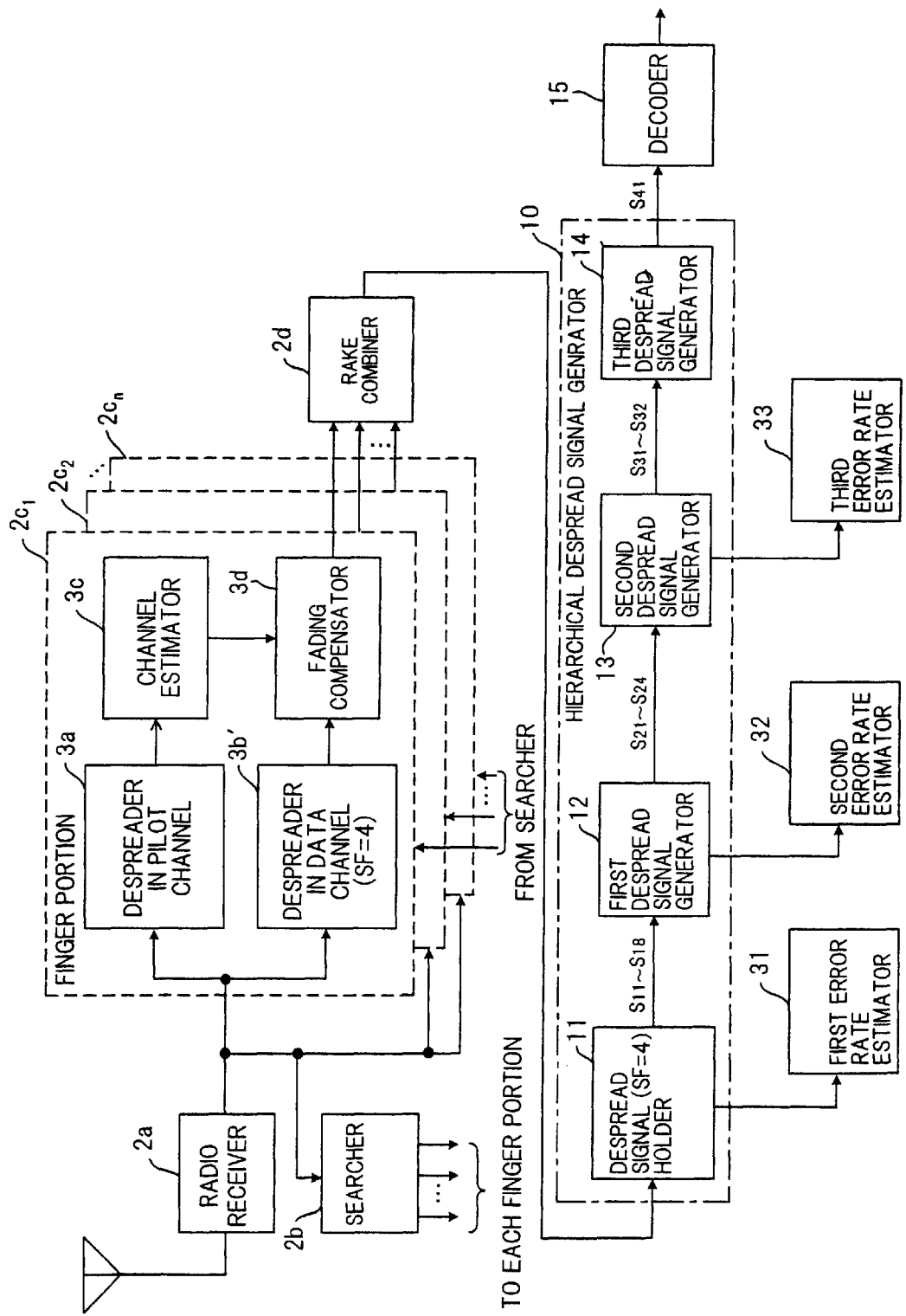
FIG. 1 shows the structure of a CDMA apparatus according to the present invention.
Figure 2:
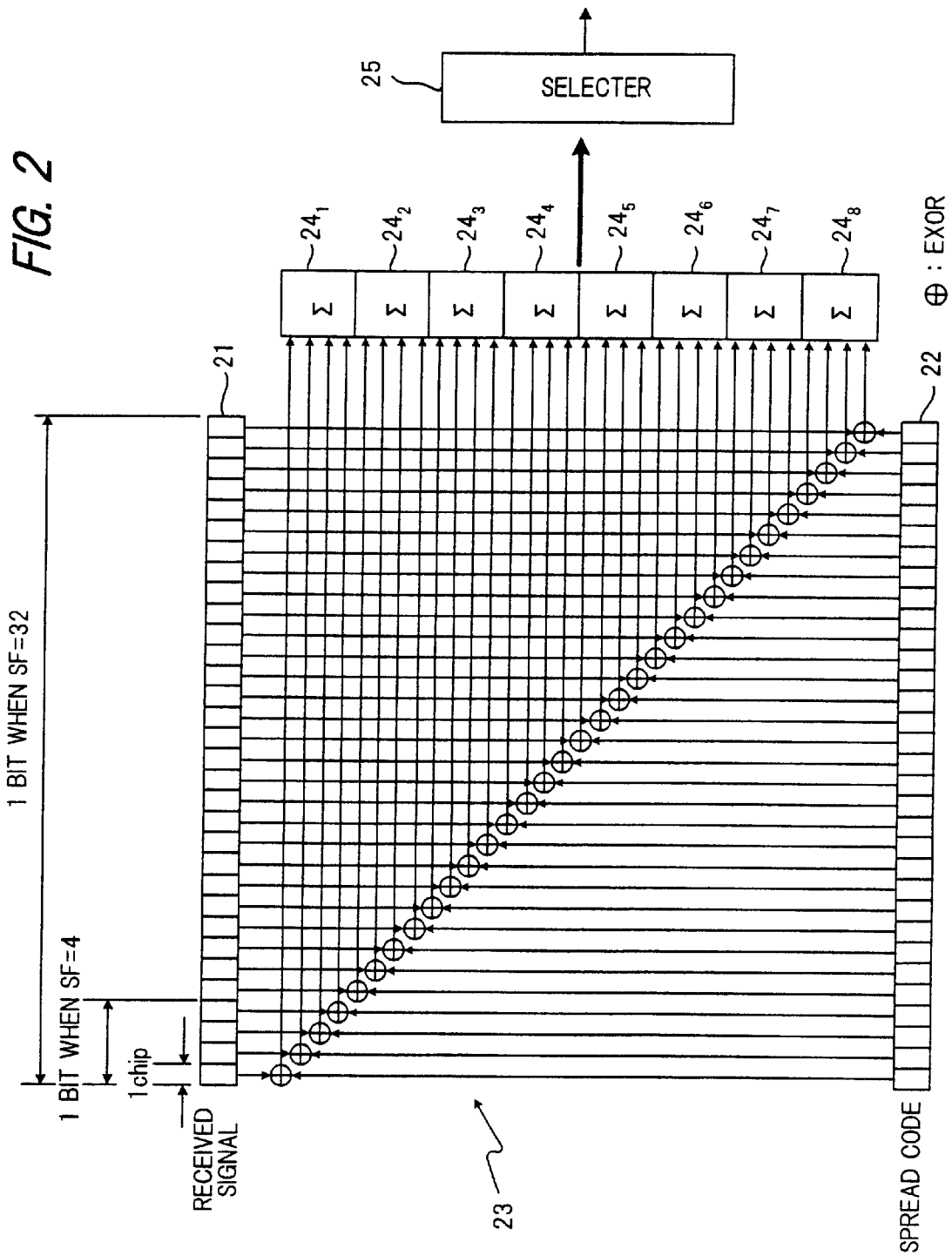
FIG. 2 shows the structure of a despreader in a data channel which corresponds to SF=4

If it is assumed that the spreading factor SF is 32, a CDMA transmitting apparatus spreads and modulates a transmit data of a bit period of Tb by a spreading code having a chip period Tc (=Tb/32) and transmits the modulated data. In the despreader $3b'$, a shift register 21 stores the received spread data (received signal) of 32 chips on every bit period Tb of the transmit data, a shift register 22 stores the spreading code of 32 chips on every bit period Tb of the transmit data, and a multiplier 23 multiplies the contents of the corresponding chips in the shift registers 21, 22, and outputs the results. If it is assumed that "1"=−1V and "0"=1V, the multiplication is replaced by an exclusive OR (EXOR) operation. For this reason, the multiplier 23 is constituted by 32 EXOR elements. Adders $24_1$ to $24_8$ add the results of the multiplications in every four chips, and a selector 25 sequentially outputs the results of additions by the adders $24_1$ to $24_8$.

Since the result of addition in every four chips is a despread signal which corresponds to a spreading factor SF of 4, it means that the despreader $3b'$ outputs eight despread signals having a spreading factor SF of 4 per transmit data of 1 bit. A fading compensator $3d$ sequentially subjects the eight despread signals having a spreading factor SF of 4 to a fading compensation processing using a channel estimation signal, and inputs the processed signals into the RAKE combiner $2d$.

A hierarchical despread signal generator 10 sums n despread signals out of the plurality of despread signals having a spreading factor SF of 4 which are sequentially output from the RAKE combiner $2d$ so as to generate a despread signal having a spreading factor SF of 4n, and generates despread signals having a predetermined spreading factors by varying n.

In the hierarchical despread signal generator 10, a despread signal holder 11 holds eight despread signals $S_{11}$ to $S_{18}$ having a spreading factor SF of 4, a first despread signal generator 12 sums every two despread signals out of despread signals $S_{11}$ to $S_{18}$ having a spreading factor SF of 4 so as to generate four despread signals $S_{21}$ to $S_{24}$ having a spreading factor SF of 8, a second despread signal generator 13 sums every two despread signals out of despread signals $S_{21}$ to $S_{24}$ having a spreading factor SF of 8 so as to generate two despread signals $S_{31}$ and $S_{32}$ having a spreading factor SF of 16, a third despread signal generator 14 sums the two despread signals $S_{31}$ and $S_{32}$ having a spreading factor SF of 16 so as to generate one despread signal $S_{41}$ having a spreading factor SF of 32, and a decoder 15 subjects the despread signal $S_{41}$ having a spreading factor SF of 32 to a decoding processing and outputs the decoded transmit data.

Figure 3:
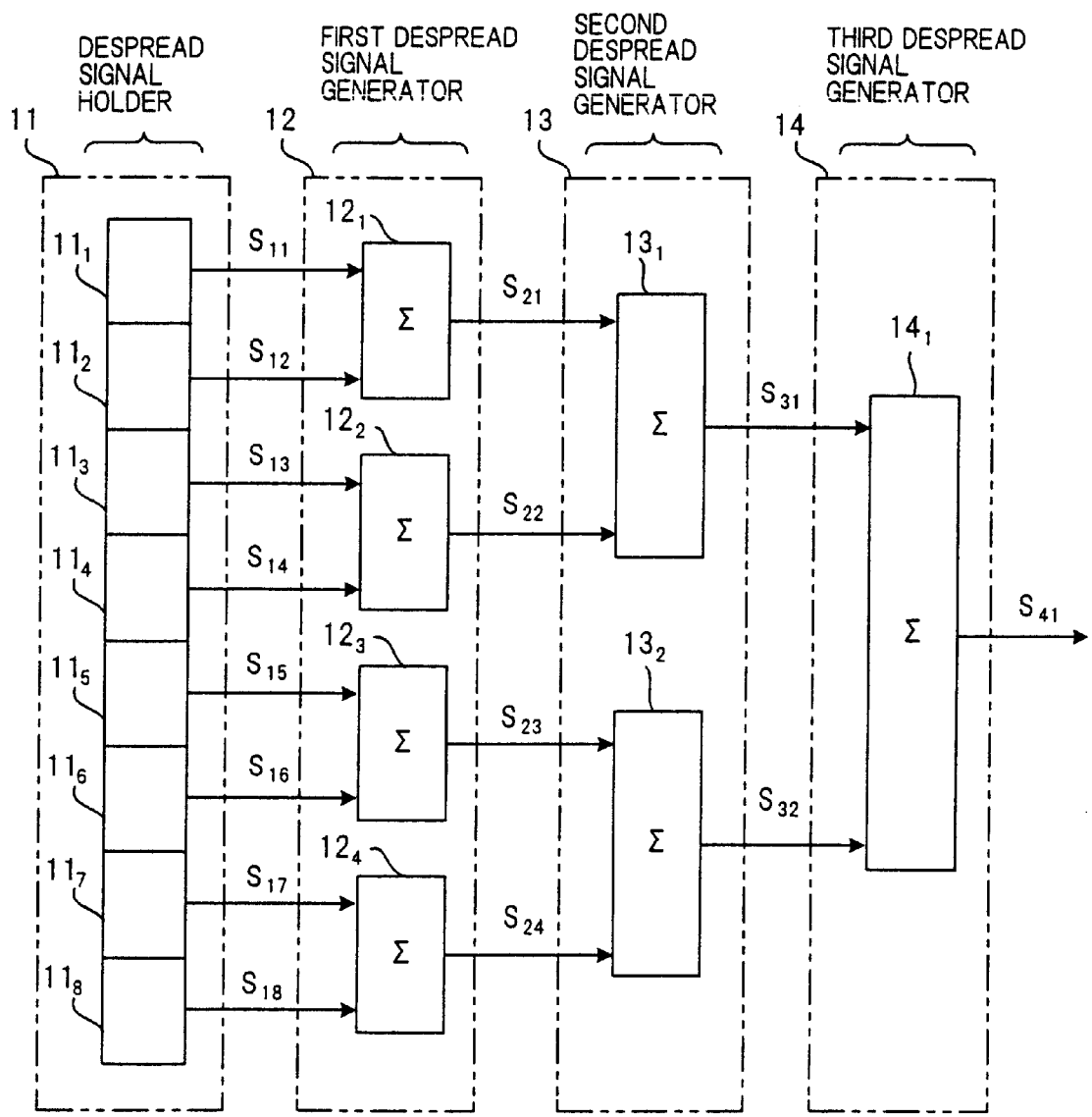
FIG. 3 shows the structure of a hierarchical despread signal generator.

FIG. 3 shows the structure of the hierarchical despread signal generator 10. The despread signal holder 11 is provided with memories $11_1$ to $11_8$ for storing the eight despread signals $S_{11}$ to $S_{18}$ having a spreading factor SF of 4, the first despread signal generator 12 is provided with adders $12_1$ to $12_4$ for summing every two despread signals out of the despread signals $S_{11}$ to $S_{18}$ having a spreading factor SF of 4, the second despread signal generator 13 is provided with adders $13_1$ to $13_2$ for summing every two despread signals out of the despread signals $S_{21}$ to $S_{24}$ having a spreading factor SF of 8, and the third despread signal generator 14 is provided with an adder $14_1$ for summing the two despread signals $S_{31}$ and $S_{32}$ having a spreading factor SF of 16.

A first error rate estimator 31 (FIG. 1) judges whether the transmit data is "1" or "0" from each of the eight despread signals $S_{11}$ to $S_{18}$ having a spreading factor SF of 4, and estimates the bit error rate BER in the spreading factor SF of 4 by using the eight results of judgments. A second error rate estimator 32 judges whether the transmit data is "1" or "0" from each of the four despread signals $S_{21}$ to $S_{24}$ having a spreading factor SF of 8, and estimates the bit error rate BER in the spreading factor SF of 8 by using the four results of judgments. A third error rate estimator 33 judges whether the transmit data is "1" or "0" from each of the two despread signals $S_{31}$ and $S_{32}$ having a spreading factor SF of 16, and estimates the bit error rate BER in the spreading factor SF of 16 by using the two results of judgments. If the spreading factor becomes ½, the energy Eb per bit becomes ½, so that the Eb/N0 decreases by 3 dB. If the spreading factor becomes ¼, the Eb/N0 decreases by 6 dB, if the spreading factor becomes ⅛, the Eb/N0 decreases by 9 dB, and the same rule applies correspondingly to the following. Accordingly, it is possible to estimate the error rate in the Eb/N0 which is 9 dB lower than the Eb/N0 in the current communication on the basis of the bit error rate BER in the spreading factor of 4 which is output from the first error rate estimator 31. It is also possible to estimate the bit error rate in the Eb/N0 which is 6 dB lower than the Eb/N0 in the current communication on the basis of the bit error rate BER in the spreading factor of 8 which is output from the second error rate estimator 32. It is further possible to estimate the bit error rate in the Eb/N0 which is 3 dB lower than the Eb/N0 in the current communication on the basis of the bit error rate BER in the spreading factor of 16 which is output from the third error rate estimator 33.

(B) Error Rate Estimator in a First Embodiment

Figure 4:
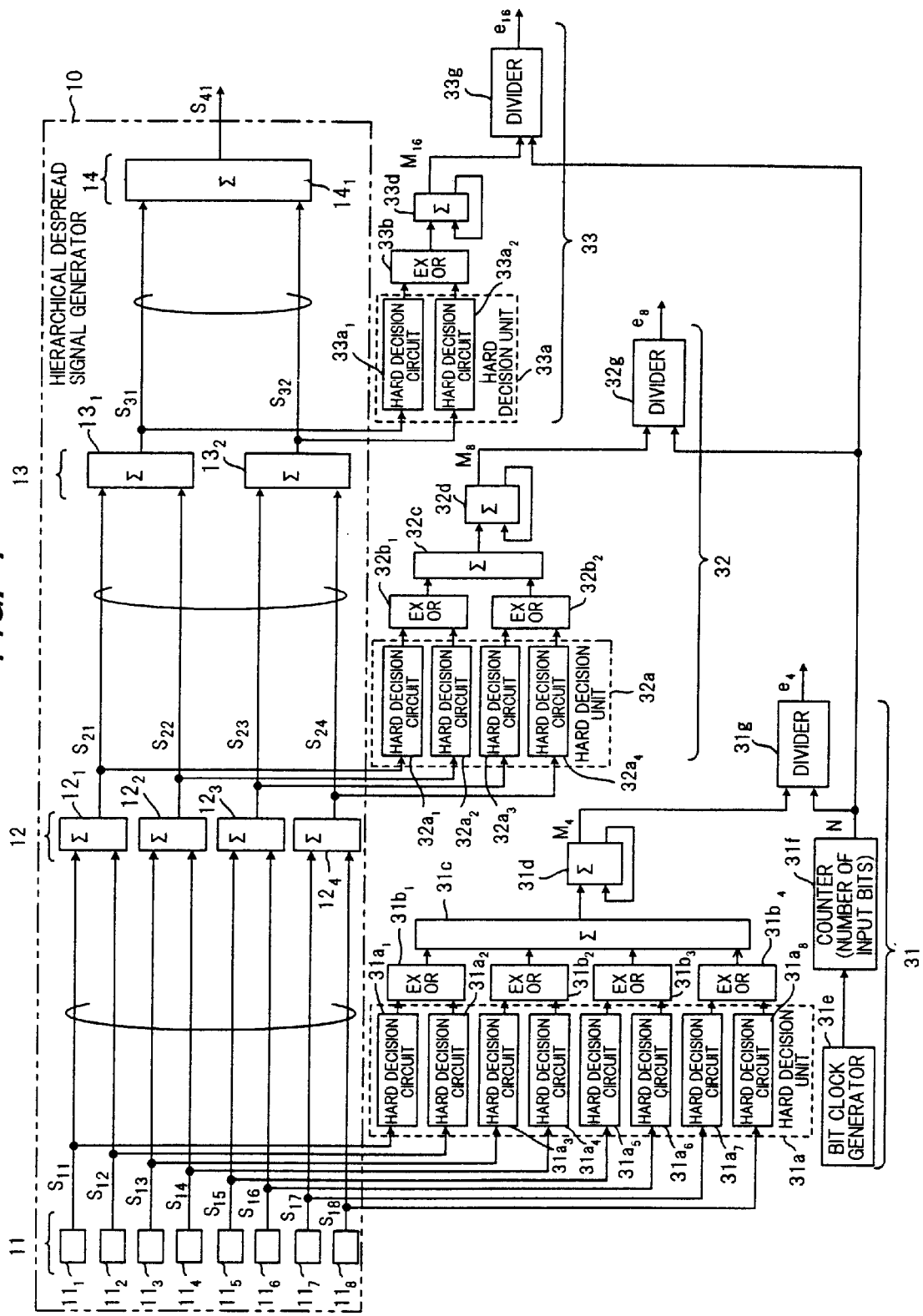
FIG. 4 shows the structure of an error rate estimator in a first embodiment of the present invention.

FIG. 4 shows the structure of an error rate estimator in a first embodiment. The same reference numerals are provided for the elements which are the same as those shown in FIG. 1. The error rate estimator in the first embodiment estimates the error rate by comparing a plurality of results ("1" or "0") of judgments in the same spreading factor.

In the first error rate estimator 31 for estimating the bit error rate in the spreading factor SF of 4, hard decision circuits $31a_1$ to $31a_8$ judge whether the eight despread signals $S_{11}$ to $S_{18}$ are "1" or "0", respectively, and output the results, EXOR circuits $31b_1$ to $31b_4$ perform EXOR operations on the respectively allotted two results of the hard decisions, and output a high level signal when the two elements disagree, an adder 31c counts the number of disagreements, and an error number calculator 31d accumulates the numbers of disagreements which are output from the adder 31c, thereby calculating the number $M_4$ of errors per N bits of the transmit data. A bit clock generator 31e generates a bit clock which is synchronous with a received data bit, and a counter 31f outputs the number N of received bits by counting the bit clock every time a data is received. Since the decision of agreement or disagreement is performed four times per bit of a received data with respect to despread signals having a spreading factor SF of 4 using eight despread signals, a divider 31g calculates the error rate $e_4$ at a spreading factor SF of 4 per N bits of the received data in accordance with the following formula:

$$e_4 = M_4/(8 \times N)$$

and outputs the result. Since the spreading factor SF of 4 is $\frac{1}{2}^3$ of the spreading factor of 32, the error rate $e_4$ is a bit error rate when the Eb/N0 is 9 dB lower than the Eb/N0 in the current communication.

In the second error rate estimator 32 for estimating the bit error rate in the spreading factor SF of 8, hard decision circuits $32a_1$ to $32a_4$ judge whether the four despread signals $S_{21}$ to $S_{24}$ are "1" or "0", respectively, and output the results, EXOR circuits $32b_1$ and $32b_2$ perform EXOR operations on the respectively allotted two results of the hard decisions, and output a high level signal when the two elements disagree, an adder 32c counts the number of disagreements, and an error number calculator 32d accumulates the numbers of disagreements which are output from the adder 32c, thereby calculating the number $M_8$ of errors per N bits of the transmit data. Since the decision of agreement or disagreement is performed twice using four despread signals per bit of a received data with respect to despread signals having a spreading factor SF of 8, a divider 32g calculates the error rate $e_8$ at a spreading factor SF of 8 per N bits of the received data in accordance with the following formula:

$$e_8 = M_8/(4 \times N)$$

and outputs the result. Since the spreading factor SF of 8 is $\frac{1}{2}^2$ of the spreading factor of 32, the error rate $e_8$ is a bit error rate when the Eb/N0 is 6 dB lower than the Eb/N0 in the current communication.

In the third error rate estimator 33 for estimating the bit error rate in the spreading factor SF of 16, hard decision circuits $33a_1$ and $33a_2$ judge whether the two despread signals $S_{31}$ and $S_{32}$ are "1" or "0", respectively, and output the results, an EXOR circuit 33b performs an EXOR operation on the results of the hard decisions, and outputs a high level signal when the two elements disagree, an adder 33d accumulates the numbers of disagreements, thereby calculating the number $M_{16}$ of errors per N bits of the transmit data. Since the decision of agreement or disagreement is performed once using two despread signals per bit of a received data with respect to despread signals having a spreading factor SF of 16, a divider 33g calculates the error rate $e_{16}$ at a spreading factor SF of 16 per N bits of the received data in accordance with the following formula:

$$e_{16} = M_{16}/(2 \times N)$$

and outputs the result. Since the spreading factor SF of 16 is ½ of the spreading factor of 32, the error rate $e_{16}$ is a bit error rate when the Eb/N0 is 3 dB lower than the Eb/N0 in the current communication.

In the above example, the agreement or disagreement is judged in adjacent two results of judgments. However, the group for comparison may be selected in a different combination.

As described above, in the first embodiment, it is possible to count the frequency of errors in each spreading factor (in other words, the frequency of errors in each Eb/N0s) by one despread processing for demodulating the transmit data of 1 bit, and it is possible to estimate the bit error rate BER by accumulating the frequencies of errors during a predetermined time. It is therefore possible to estimate the error rate in a plurality of Eb/N0s which are lower than the Eb/N0 in the current communication in a short time. In addition, an encoder, which is required in the prior art, is dispensed with.

(C) Error Rate Estimator in a Second Embodiment

Figure 5:
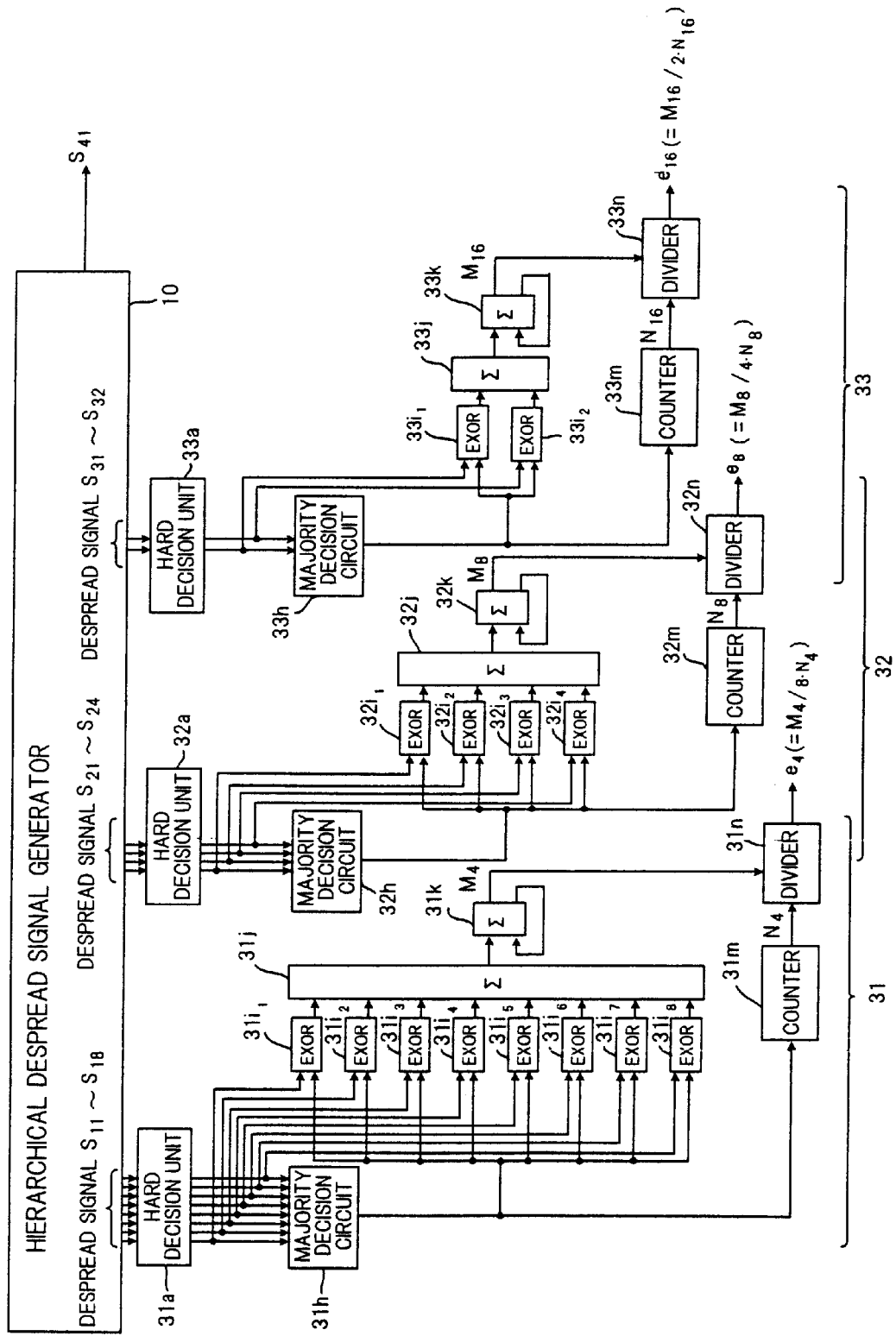
FIG. 5 shows the structure of an error rate estimator in a second embodiment of the present invention.

FIG. 5 shows the structure of an error rate estimator in a second embodiment. The same reference numerals are provided for the elements which are the same as those shown in FIG. 1. The error rate estimator in the second embodiment estimates the error rate by deciding "1" or "0" by a majority in a plurality of results of judgments in the same spreading factor, and obtains the number of disagreements by comparing the result of the decision by a majority with an individual result of judgment.

In the first error rate estimator 31 for estimating the bit error rate in the spreading factor SF of 4, a hard decision unit 31a judges whether the eight despread signals $S_{11}$ to $S_{18}$ are "1" or "0", and outputs the results, and a majority decision circuit 31h outputs "1" or "0" which is decided by a majority in the eight results of hard decisions. EXOR circuits $31i_1$ to $31i_8$ perform EXOR operations on the eight results of hard decisions which are output from the hard decision unit 31a and the result of decision by a majority, and output a high level signal when the two elements disagree, an adder 31j counts the number of disagreements, and an error number calculator 31k accumulates the numbers of disagreements which are output from the adder 31j, thereby calculating the number $M_4$ of errors in $N_4$ bits of the transmit data. A counter 31m counts up every time the result of decision by a majority is output, and outputs the number $N_4$ of bits of a received data. Since the decision of agreement or disagreement is performed eight times per bit of a received data with respect to despread signals having a spreading factor SF of 4, a divider 31n calculates the error rate $e_4$ at a spreading factor SF of 4 per $N_4$ bits of the received data in accordance with the following formula:

$$e_4 = M_4/(8 \times N_4)$$

and outputs the result. Since the spreading factor SF of 4 is $\frac{1}{2}^3$ of the spreading factor of 32, the error rate $e_4$ is a bit error rate when the Eb/N0 is 9 dB lower than the Eb/N0 in the current communication.

In the second error rate estimator 32 for estimating the bit error rate in the spreading factor SF of 8, the hard decision unit 32a judges whether the four despread signals $S_{21}$ to $S_{24}$ are "1" or "0", and outputs the results, and a majority decision circuit 32h outputs "1" or "0" which is decided by a majority in the four of hard decisions. EXOR circuits $32i_1$ to $32i_4$ perform EXOR operations on the four results of hard decisions which are output from the hard decision unit 32a and the result of decision by a majority, and output a high level signal when the two elements disagree, an adder 32j counts the number of disagreements, and an error number calculator 32k accumulates the numbers of disagreements which are output from the adder 32j, thereby calculating the number $M_8$ of errors in $N_8$ bits of the transmit data. A counter 32m counts up every time the result of decision by a majority is output, and outputs the number $N_8$ of bits of a received data. Since the decision of agreement or disagreement is performed four times per bit of a received data with respect to despread signals having a spreading factor SF of 8, a divider 32n calculates the error rate $e_8$ at a spreading factor SF of 8 per $N_8$ bits of the received data in accordance with the following formula:

$$e_8 = M_8/(4 \times N_8)$$

and outputs the result. Since the spreading factor SF of 8 is $\frac{1}{2}^2$ of the spreading factor of 32, the error rate $e_8$ is a bit error rate when the Eb/N0 is 6 dB lower than the Eb/N0 in the current communication.

In the third error rate estimator 33 for estimating the bit error rate in the spreading factor SF of 16, the hard decision unit 33a judges whether the two despread signals $S_{31}$ and $S_{32}$ are "1" or "0", and outputs the results, and a majority decision circuit 33h outputs "1" or "0" which is decided by a majority in the two results of hard decisions. EXOR circuits $33i_1$ and $33i_2$ perform EXOR operations on the two results of hard decisions which are output from the hard decision unit 33a and the result of decision by a majority, and output a high level signal when the two elements disagree, an adder 33j counts the number of disagreements, and an error number calculator 33j accumulates the numbers of disagreements which are output from the adder 33j, thereby calculating the number $M_{16}$ of errors in $N_{16}$ bits of the transmit data. A counter 33m counts up every time the result of decision by a majority is output, and outputs the number $N_{16}$ of bits of a received data. Since the decision of agreement or disagreement is performed twice per bit of a received data with respect to despread signals having a spreading factor SF of 16, a divider 33n calculates the error rate $e_{16}$ at a spreading factor SF of 16 per $N_{16}$ bits of the received data in accordance with the following formula:

$$e_{16} = M_{16}/(2 \times N_{16})$$

and outputs the result. Since the spreading factor SF of 16 is ½ of the spreading factor of 32, the error rate $e_{16}$ is a bit error rate when the Eb/N0 is 3 dB lower than the Eb/N0 in the current communication.

As described above, in the second embodiment, it is possible to count the frequency of errors in each spreading factor (in other words, the frequency of errors in each Eb/N0) by one despread processing for demodulating the transmit data of 1 bit, and it is possible to estimate the bit error rate BER by accumulating the frequencies of errors during a predetermined time. It is therefore possible to estimate the error rate in a plurality of Eb/N0s which are lower than the Eb/N0 in the current communication in a short time. In addition, an encoder, which is required in the prior art, is dispensed with.

(D) Error Rate Estimator in a Third Embodiment

Figure 6:
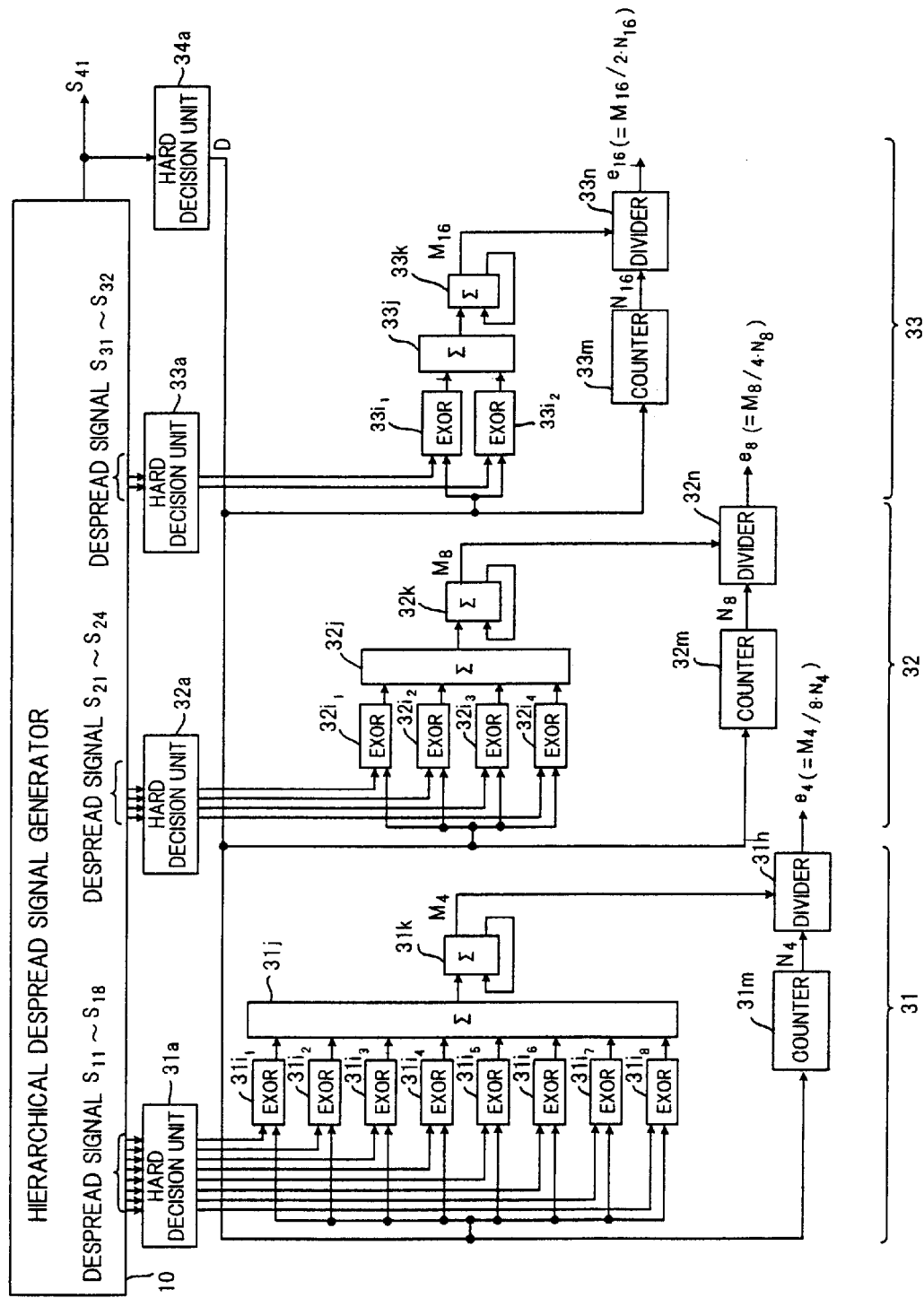
FIG. 6 shows the structure of an error rate estimator in a third embodiment of the present invention.

FIG. 6 shows the structure of an error rate estimator in a third embodiment. The same reference numerals are provided for the elements which are the same as those shown in FIG. 5. The error rate estimator in the third embodiment estimates the error rate by obtaining a despread signal having the same spreading factor as that (SF=32) on the transmission side, judging whether the transmit data is "1" or "0" from the despread signal and, on the assumption that the result of this judgment is right, comparing the result of this judgment with the result of judgment in each spreading factor.

This embodiment is different from the second embodiment shown in FIG. 5 in the following points:

(1) that the majority decision circuits 31h~33h are replaced by a hard decision circuit 34a;

(2) that the hard decision circuit 34a judges whether a despread signal $S_{41}$ having a spreading factor SF of 32 is "1" or "0" and outputs the result D of judgment;

(3) that in the error rate estimator 31, the EXOR circuits $31i_1$ to $31i_8$ perform EXOR operations on the eight results of hard decisions which are output from the hard decision unit 31a and the result D of judgment which is output from the hard decision circuit 34a;

(4) that in the error rate estimator 32, the EXOR circuits $32i_1$ to $32i_4$ perform EXOR operations on the four results of hard decisions which are output from the hard decision unit 32a and the result D of judgment which is output from the hard decision circuit 34a; and (5) that in the error rate estimator 33, the EXOR circuits $33i_1$ and $33i_2$ perform EXOR operations on the two results of hard decisions which are output from the hard decision unit 33a and the result D of judgment which is output from the hard decision circuit 34a.

According to the third embodiment, it is possible to count the frequency of errors in each spreading factor (in other words, the frequency of errors in each Eb/N0) by one despread processing for demodulating the transmit data of 1 bit, and it is possible to estimate the bit error rate BER by accumulating the frequencies of errors during a predetermined time. It is therefore possible to estimate the error rate in a plurality of Eb/N0s which are lower than the Eb/N0 in the current communication in a short time. In addition, an encoder, which is required in the prior art, is dispensed with. Furthermore, since the error rate is estimated by judging whether the data is "1" or "0" from a despread signal having the same spreading factor as that (SF=32) on the transmission side, and comparing the result of judgment with the result of judgment in each spreading factor, it is possible to estimate the error rate more accurately.

(E) Error Rate Estimator in a Fourth Embodiment

Figure 7:
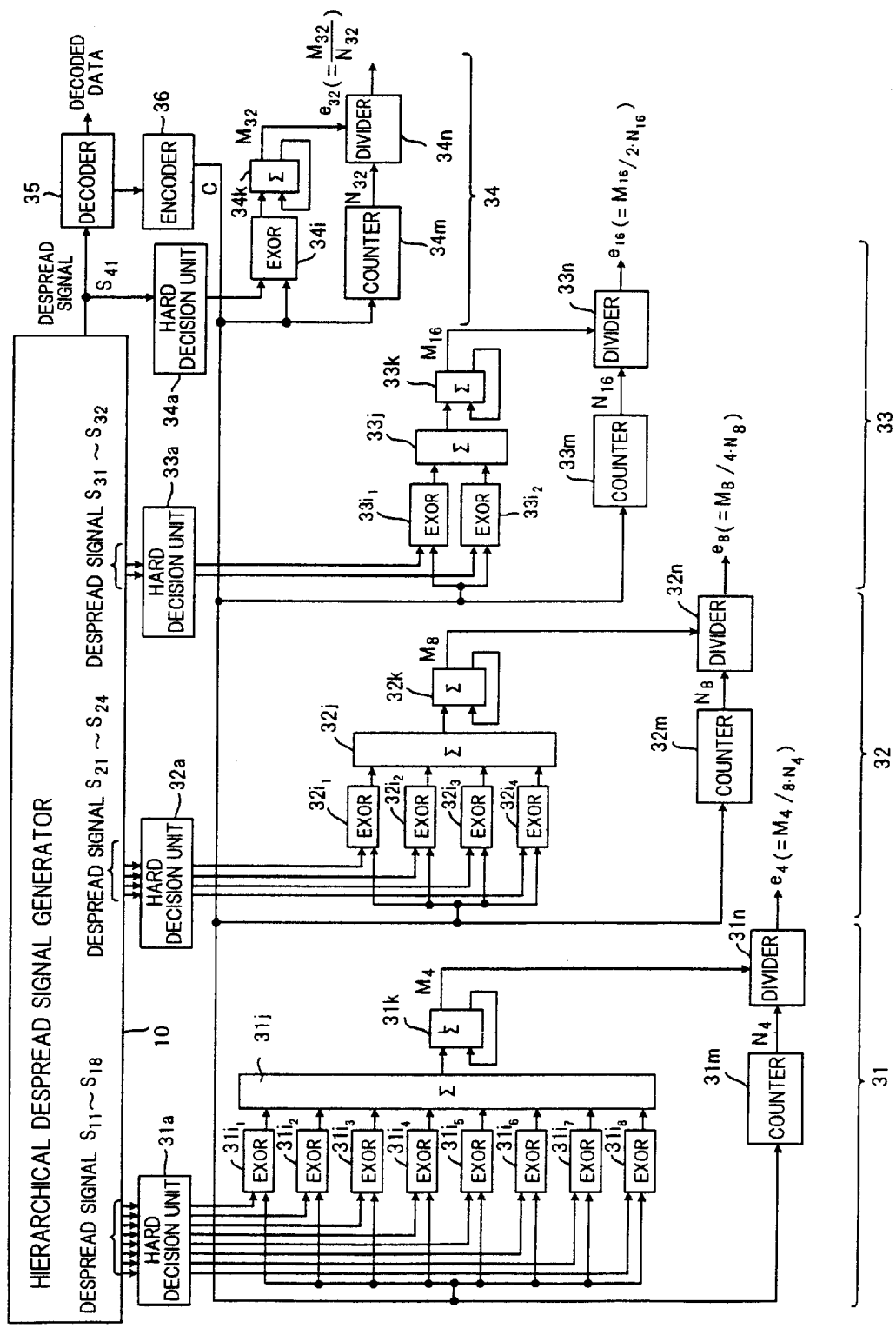
FIG. 7 shows the structure of an error rate estimator in a fourth embodiment of the present invention.

FIG. 7 shows the structure of an error rate estimator in a fourth embodiment. The same reference numerals are provided for the elements which are the same as those in the third embodiment shown in FIG. 6. The error rate estimator in the fourth embodiment estimates the error rate by decoding the data by using a despread signal having the same spreading factor as that on the transmission side, encoding the decoded data again, and comparing the coded data with the result of judgment in each spreading factor.

This embodiment is different from the third embodiment shown in FIG. 6 in the following points:

(1) that an error rate estimator 34 is provided;

(2) that a decoder 35 for decoding a despread signal $S_{41}$ having the same spreading factor as that on the transmission side and an encoder 36 for encoding the decoded data again are provided;

(3) that the encoder 36 outputs coded data C;

(4) that in the error rate estimator 31, the EXOR circuits $31i_1$ to $31i_8$ perform EXOR operations on the eight results of hard decisions which are output from the hard decision unit 31a and the coded data C which is output from the encoder 36;

(5) that in the error rate estimator 32, the EXOR circuits $32i_1$ to $32i_4$ perform EXOR operations on the four results of hard decisions which are output from the hard decision unit 32a and the coded data C which is output from the encoder 36;

(6) that in the error rate estimator 33, the EXOR circuits 33$i_1$ and 33$i_2$ perform EXOR operations on the two results of hard decisions which are output from the hard decision unit 33a and the coded data C which is output from the encoder 36; and (7) that in the error rate estimator 34, the EXOR circuit 34$i$ performs an EXOR operation on the one result of hard decision which is output from the hard decision circuit 34a and the coded data C which is output from the encoder 36 and estimates an error rate $e_{32}$ at a spreading factor SF of 32.

In the error rate estimator 34, an error number calculator 34$k$ calculates the number $M_{32}$ of errors in $N_{32}$ bits of the transmit data by accumulating the numbers of disagreements which are output from the EXOR circuit 34$i$, a counter 34$m$ counts up every time a new coded data is output and outputs the number $N_{32}$ of bits of the received data, and a divider 34$n$ calculates the error rate $e_{32}$ at a spreading factor SF of 32 per $N_{32}$ bits of the received data in accordance with the following formula:

$$e_{32}=M_{32}/N_{32}$$

and outputs the result. This error rate $e_{32}$ is a bit error rate in the Eb/N0 in the current communication.

As described above, according to the fourth embodiment, it is possible to count the frequency of errors in each spreading factor (n other words, the frequency of errors in each Eb/N0) by one despread processing for demodulating the transmit data of 1 bit, and it is possible to estimate the bit error rate BER by accumulating the frequencies of errors during a predetermined time. It is therefore possible to estimate the error rate in a plurality of Eb/N0s which are lower than the Eb/N0 in the current communication in a short time. In addition, since the error rate is estimated by comparing the data which is encoded again after the error correction and decoding process by the decoder with the result of judgment in each spreading factor, it is possible to estimate the error rate more accurately.

(F) Error Rate Estimator in a Fifth Embodiment

Figure 8:
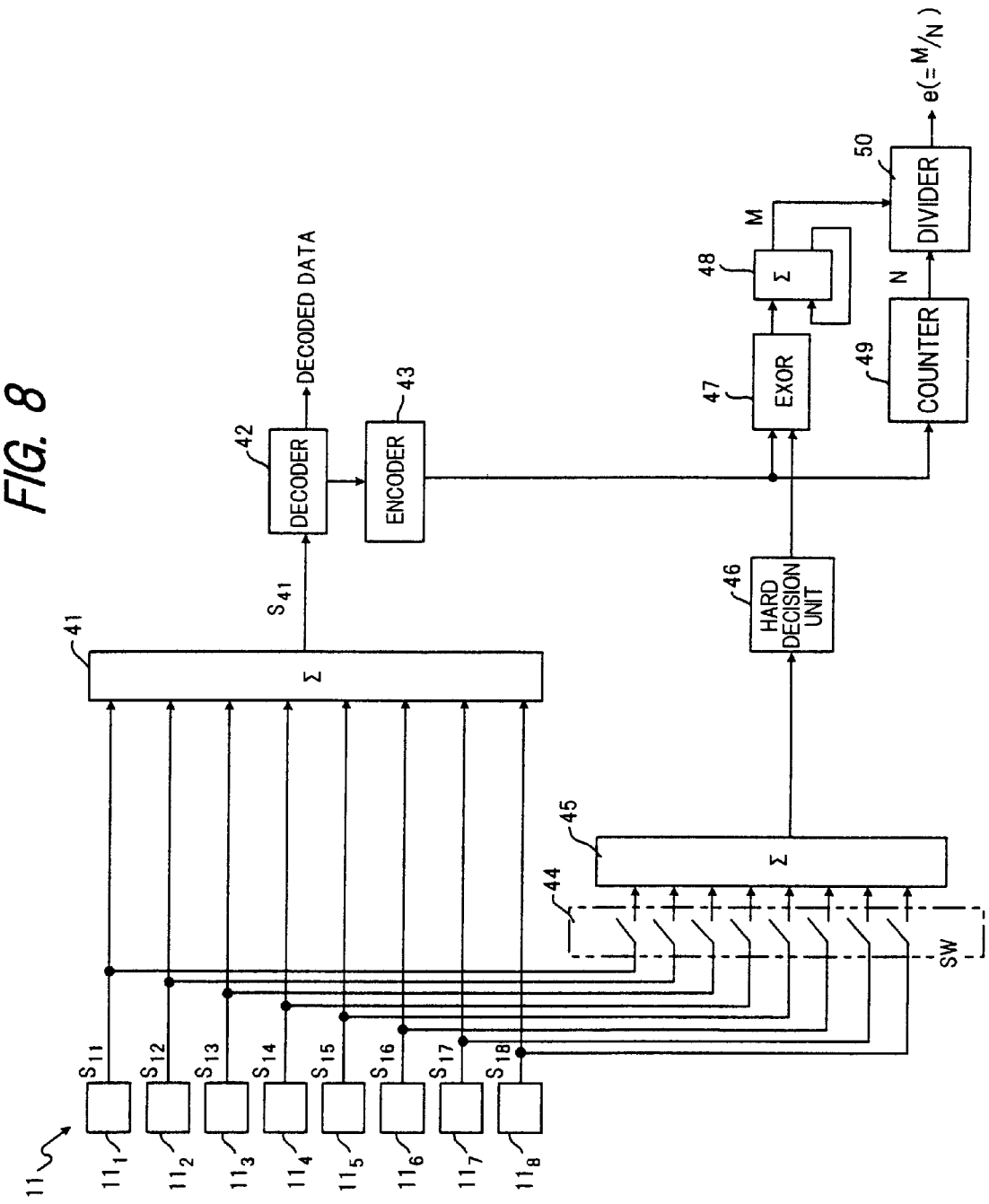
FIG. 8 shows the structure of an error rate estimator in a fifth embodiment of the present invention.

In the first to fourth embodiments, (1) $2^m$ despread signals having a spreading factor SF of 4 (=$2^2$) are summed, and a plurality of despread signals having a spreading factor of $2^{(2+m)}$ are output, (2) m is varied and a plurality of despread signals in various spreading factor are output, (3) and the error rate is estimated by using the plurality of despread signal in each spreading factor. However, the number of despread signals which are summed is not limited to an m-th power of 2 ($2^m$). It is possible to constitute an error rate estimator in such a manner as to estimate the bit error rate in an arbitrary spreading factor, namely, in an arbitrary Eb/N0. FIG. 8 shows the structure of an error rate estimator in a fifth embodiment which enables the number of despread signals which are summed to be determined freely.

The despread signal holder 11 holds eight despread signals $S_{11}$ to $S_{18}$ having a spreading factor SF of 4 in the memories $11_1$ to $11_8$, an adder 41 sums all the despread signals $S_{11}$ to $S_{18}$ and outputs a despread signal $S_{41}$ having a spreading factor SF of 32, a decoder 42 subjects the despread signal $S_{41}$ having a spreading factor SF of 32 to an error correction processing and decodes the transmit data, and an encoder 43 encodes the decoded data again and outputs the coded data. A switch portion 44 turns on any given number k of switches and inputs k despread signals (having a spreading factor SF of 4) into an adder 45. The adder 45 sums the k despread signals which are input through the switches and outputs a despread signal having a spreading factor of 4·k. A hard decision circuit 46 judges whether the despread signal input from the adder 45 is "1" or "0", and outputs the result of decision. An EXOR circuit 47 obtains the agreement or disagreement of the coded data output from the encoder 43 and the result of judgment output from the hard decision circuit 46 by an EXOR operation, and an error number calculator 48 counts up every time the output of the EXOR circuit 47 is a high level signal, thereby accumulating the numbers M of disagreements. A counter 49 counts up every time a new coded data is output, and outputs the number N of bits of a received data, and an analog divider 50 calculates the error rate e at a spreading factor SF of 4·k per N bits of the received data in accordance with the following formula:

$$e=M/N$$

and outputs the result. According to the fifth embodiment, if five switches, for example, are turned on, signals for 4×5=20 chips are summed (SF=20). Since $10\log_{10}(20/32)=-2$, it is possible to estimate the error rate in Eb/N0s which are 2 dB lower than the Eb/N0 in the current communication.

In the above example, the frequency of errors is calculated by outputting one despread signal having a spreading factor SF of 4·k per bit of the received data. It is also possible to output a plurality of despread signals having a spreading factor SF of 4·k per bit of the received data by varying the combination of k despread signals which are input into the adder 45, and to detect whether the signals are "1" or "0" individually.

(G) Error Rate Estimator in a Sixth Embodiment

Figure 9:
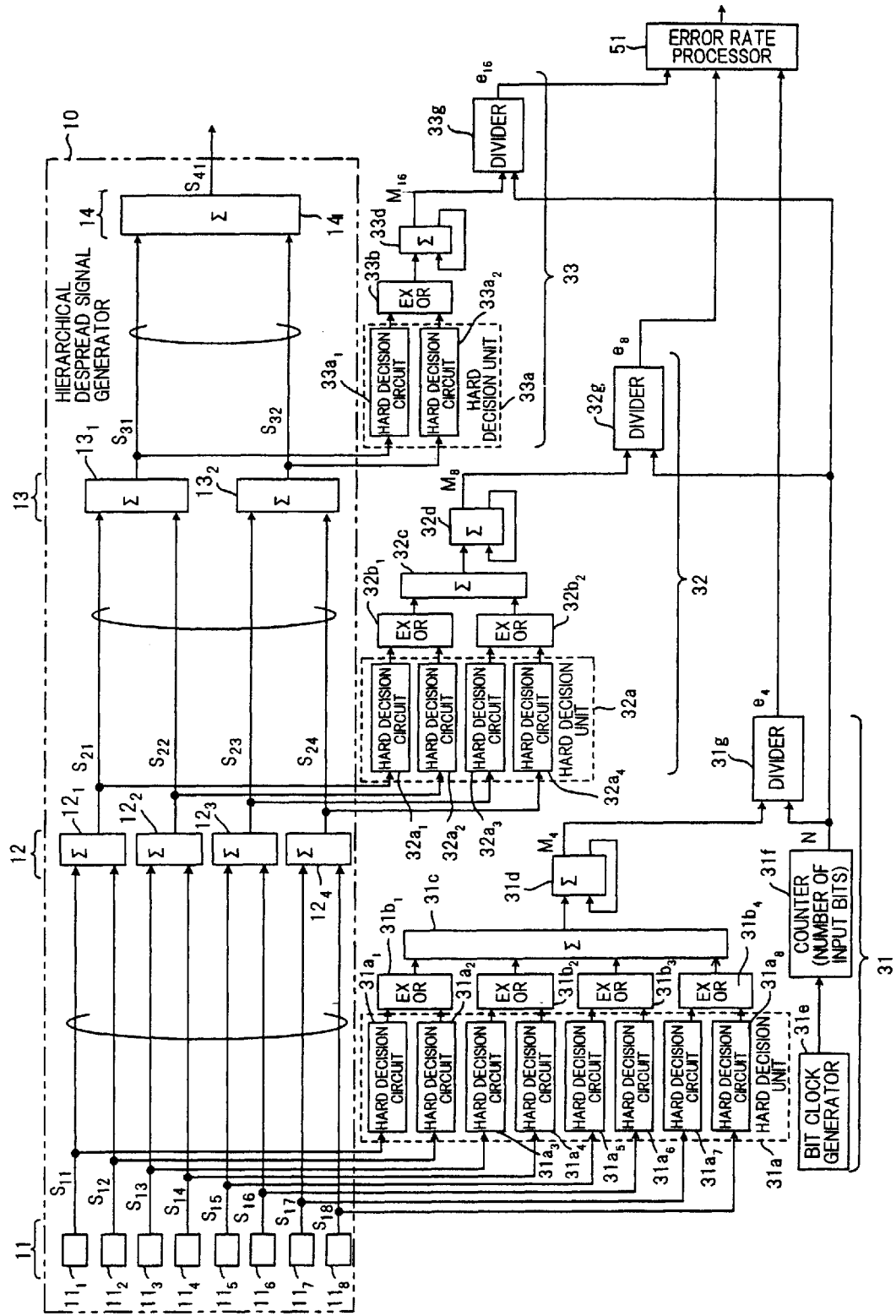
FIG. 9 shows the structure of an error rate estimator in a sixth embodiment of the present invention.

FIG. 9 shows the structure of an error rate estimator in a sixth embodiment. The same reference numerals are provided for the elements which are the same as those in the first embodiment shown in FIG. 4. In the sixth embodiment, the bit error rate BER or an Eb/N0 for achieving a desired bit error rate BER is output by interpolation.

Figure 10:
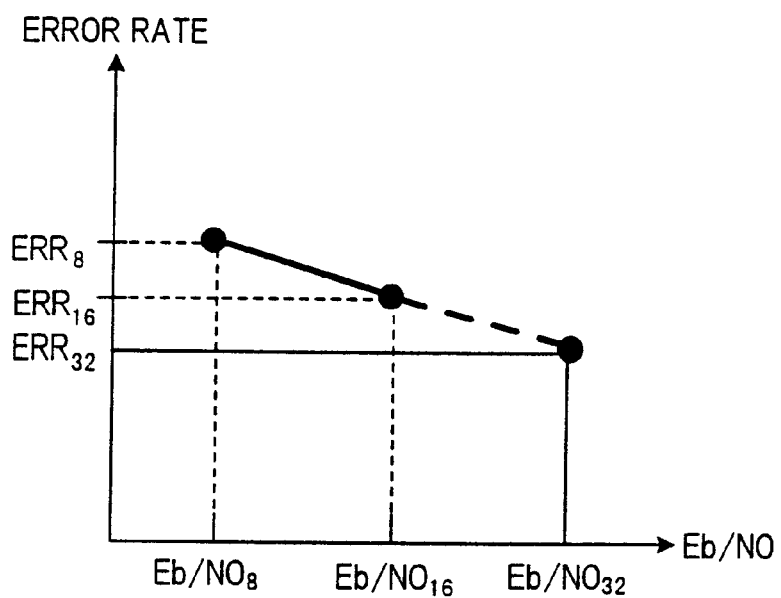
FIG. 10 is an explanatory view of the interpolation of the error rate in the sixth embodiment.

The sixth embodiment shown in FIG. 9 is different from the first embodiment shown in FIG. 4 in that an error rate processor 51 is provided. According to the first to fifth embodiments, it is possible to estimate the error rate BER$_{16}$, BER$_8$, . . . in the Eb/N0$_{16}$, Eb/N0$_8$, . . . which are lower than the Eb/N0 in the current communication by 3 dB, 6 dB, . . . . Therefore, the error rate processor 51 obtains an error rate in a predetermined Eb/N0 by interpolation using these estimated error rates. For example, the bit error rate BER$_{32}$ in the Eb/N0 (=Eb/N0$_{32}$) in the current communication is calculated by interpolation, as shown in FIG. 10.

Figure 11:
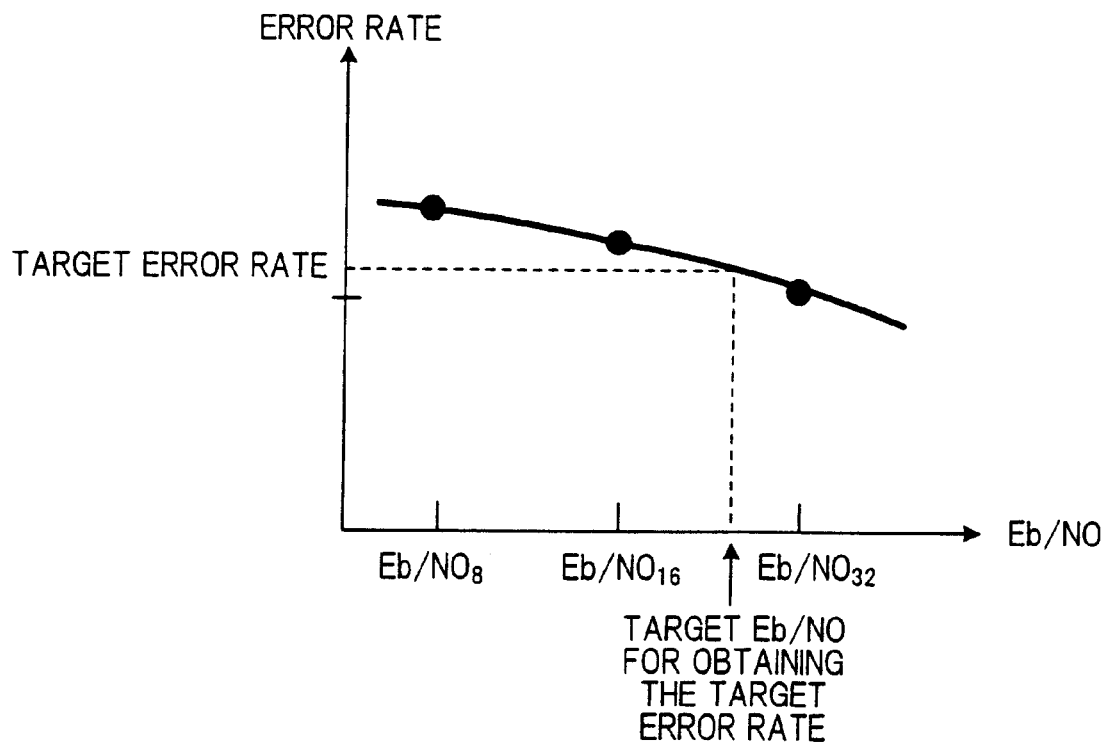
FIG. 11 is an explanatory view of the estimation of a desired Eb/N0 with respect to the target error rate in the sixth embodiment.
Figure 12:
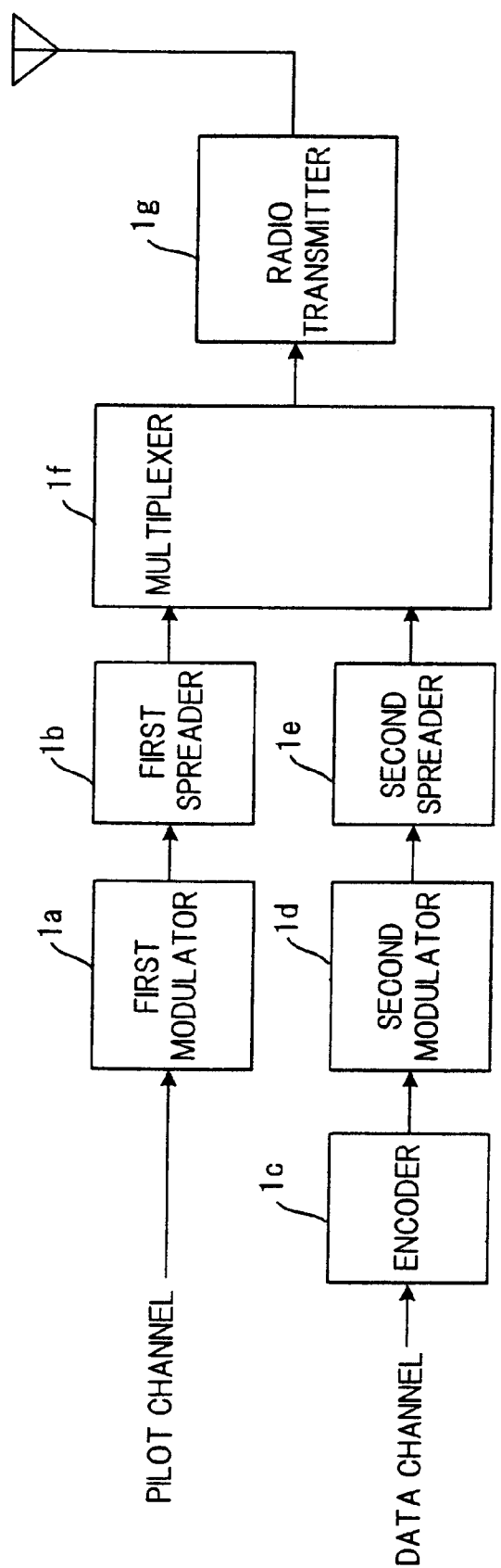
FIG. 12 shows the structure of a CDMA transmitter in a mobile station.
Figure 13:
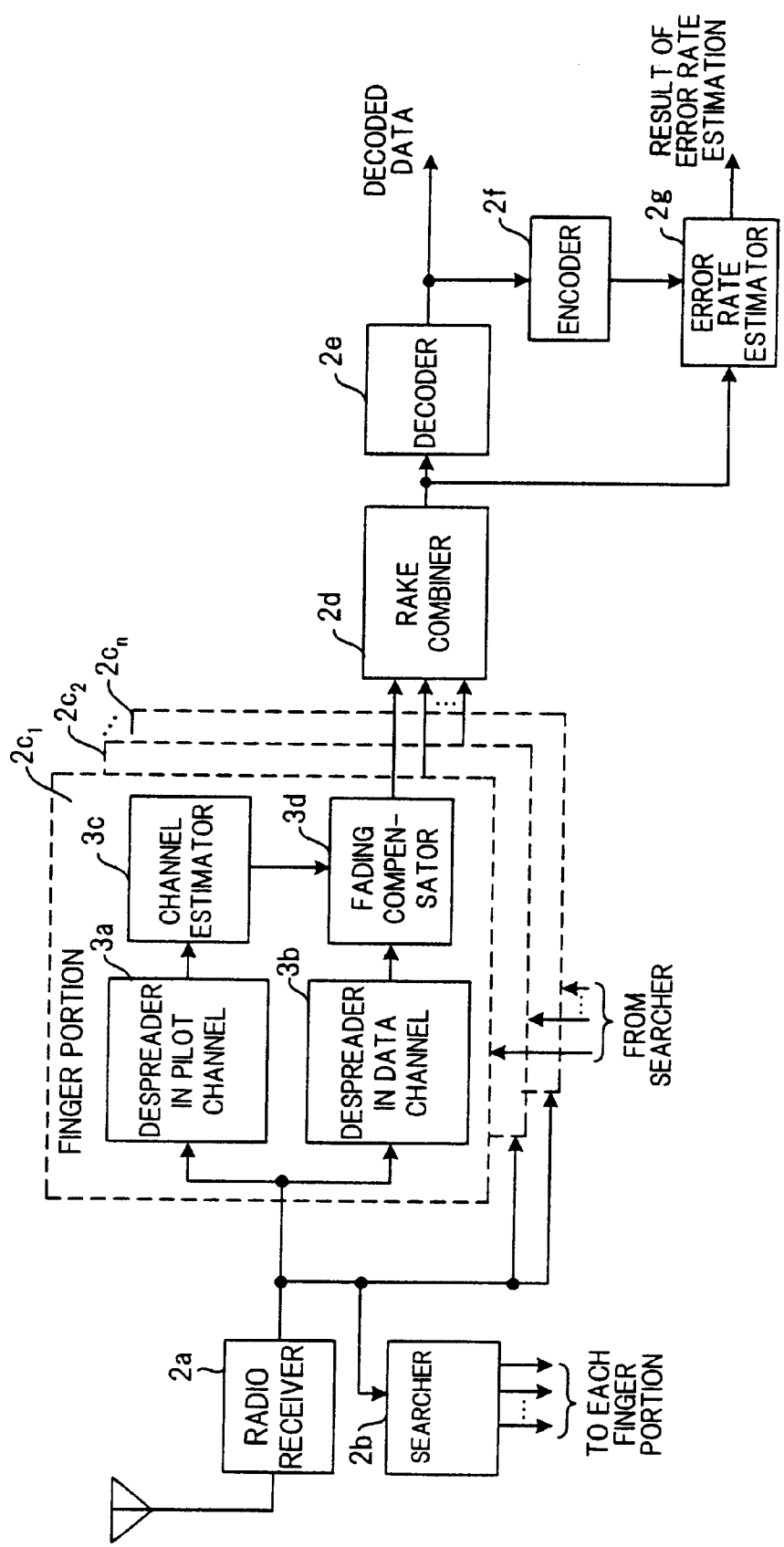
FIG. 13 shows the structure of a CDMA receiver at a base station.
Figure 14:
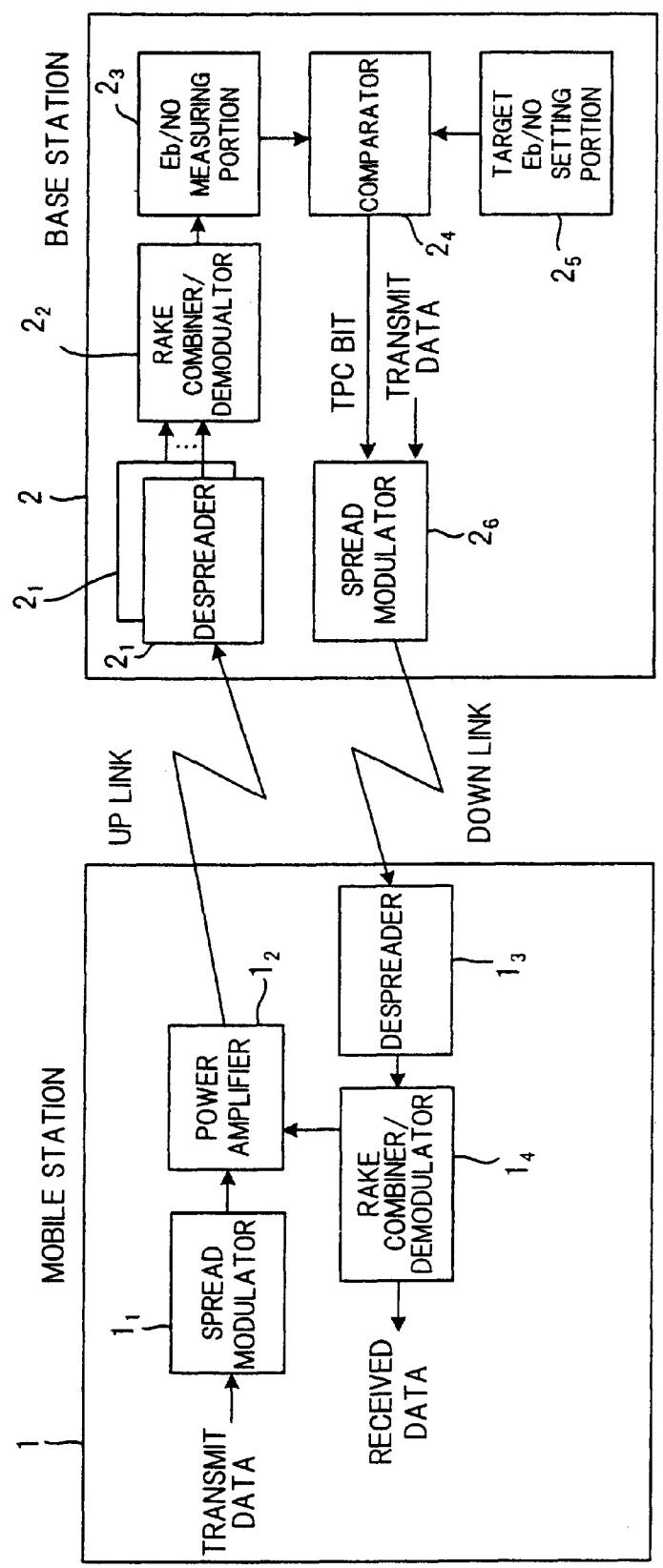
FIG. 14 shows the structure of transmission power control in the prior art.

The error rate processor 51 is also able to obtain the target Eb/N0 which achieves a desired bit error rate by interpolation on the basis of the Eb/N0·error rate characteristic, as shown in FIG. 11.

As described above, in the sixth embodiment, the error rate processor 51 is provided and the error rate processor 51 outputs the bit error rate BER in a predetermined Eb/N0 or an Eb/N0 for achieving a desired bit error rate BER by interpolation. It is also possible to provide the error rate processor 51 in the second to fifth embodiments so as to perform a similar processing.

As described above, according to the present invention, since an error rate is estimated by performing partial despread using a spreading code which is ½ or ¼ as long as the actual spreading code, it is possible to consecutively obtain the error rates in Eb/N0s which are lower than the actual Eb/N0 by 3 dB, 6 dB, . . . in one reception system.

In addition, according to the present invention, it is possible to estimate the error rate in a given spreading factor, namely, in a given Eb/N0 by varying the number of chips to be summed.

According to the present invention, it is possible to estimate the error rate in the Eb/N0 in the current communication by interpolation using the obtained error rate·Eb/N0 characteristic.

According to the present invention, it is possible to estimate and set the target Eb/N0 which is necessary for achieving a desired bit error rate BER by interpolation using the obtained error rate·Eb/N0 characteristic.

Furthermore, according to the present invention, it is possible to count the frequency of errors (in other words, the frequency of errors in each Eb/N0) in each spreading factor by one despread processing for demodulating the transmit data of 1 bit, and it is possible to estimate the bit error rate BER by accumulating the frequencies of errors during a predetermined time. It is therefore possible to estimate the error rate in a plurality of Eb/N0s which are lower than the Eb/N0 in the current communication in a short time, and to determine and set the target Eb/N0 which achieves a desired bit error rate in a short time by interpolation using the error rates in these plurality of Eb/N0s.

According to the present invention, since the target Eb/N0 which achieves a desired bit error rate is confirmed in a short time in sending power control, it is possible to immediately control the sending power so that the actual Eb/N0 may equal to the target Eb/N0 and to obtain the desired bit error rate in a short time.

In addition, according to the present invention, since it is possible to calculate the error rate in the Eb/N0 in the current communication from the error rates in a plurality of Eb/N0s which are lower than the Eb/N0 in the current communication by interpolation, it is possible to report the error rate in the Eb/N0 in the current communication to a host apparatus in a short time.

As many apparently widely different embodiments of the present invention can be made without departing from the spirit and scope thereof, it is to be understood that the invention is not limited to the specific embodiments thereof except as defined in the depended claims.

What is claimed is:

1. A CDMA receiving apparatus in a CDMA communication system for transmitting a transmit data subjected to a spread modulation processing with a predetermined spreading factor, and demodulating said transmit data by subjecting received signals to a despread processing, comprising:

a first despread signal generator for multiplying a received signal by the same code as a spreading code on the transmission side for each chip, dividing the results of multiplications for all the chips into a plurality of groups, and summing said results of multiplications in each group so as to output a plurality of despread signals having a spreading factor which is smaller than the spreading factor on the transmission side;

a second despread signal generator for summing every k of said despread signals which are output from said first despread signal generator so as to generate a plurality of despread signals having predetermined spreading factor; and a bit error rate estimator for estimating a bit error rate in each spreading factor by judging said transmit data from each of said despread signals in each spreading factor and using the result of judgment.

2. A CDMA receiving apparatus according to claim 1, wherein said first despread signal generator outputs a plurality of despread signals having a spreading factor which is $\frac{1}{2^n}$ as large as the spreading factor SF on the transmission side by dividing the results of multiplications of said spreading code and said received signal for all the chips into $2^n$ groups and summing said results of multiplications for all the chips in each group;

said second despread signal generator sums $2^m$ ($m \leq n$) of said despread signals in each group so as to output despread signal having a spreading factor of $S/2^{(n-m)}$, and outputs despread signals having various spreading factors by varying m; and said error rate estimator estimates the error rate in each spreading factor by judging the transmit data for each bit from each of said despread signals and using the result of judgment.

3. A CDMA receiving apparatus according to claim 1, wherein said error rate estimator estimates error rates in a plurality of Eb/N0s which are lower than the Eb/N0 in the current communication on the basis of said error rate in each spreading factor.

4. A CDMA receiving apparatus according to claim 1, wherein said error rate estimator estimates an error rate in a spreading factor by comparing a plurality of results of judgments in said spreading factor.

5. A CDMA receiving apparatus according to claim 1, wherein said error rate estimator obtains a bit error rate in a spreading factor by judging a plurality of results of judgments in said spreading factor by a majority, comparing the result of the judgment by a majority with each result of judgment and obtaining the number of disagreements.

6. A CDMA receiving apparatus according to claim 1, wherein said error rate estimator estimates said bit error rate by obtaining a despread signal having the same spreading factor as that on the transmission side, judging said transmit data from said despread signal, comparing the result of the judgment with a plurality of results of judgments in a predetermined spreading factor which is smaller than that on the transmission side, and obtaining the number of disagreements.

7. A CDMA receiving apparatus according to claim 1, further comprising a decoder/encoder for decoding said transmit data by using a despread signal having the same spreading factor as that on the transmission side, and encoding the decoded data obtained, wherein said error rate estimator estimates a bit error rate by comparing the coded data with a plurality of results of judgments in a predetermined spreading factor which is smaller than that on the transmission side, and obtaining the number of disagreements.

8. A CDMA receiving apparatus according to claim 3, further comprising an interpolator for obtaining the error rate in the Eb/N0 in the current communication from the error rates in a plurality of Eb/N0s which are lower than said Eb/N0 in the current communication by interpolation.

9. A CDMA receiving apparatus according to claim 3, further comprising an interpolator for obtaining error rates in a plurality of Eb/N0s and calculating the Eb/N0 which is necessary for obtaining the target error rate from said error rates by interpolation.

* * * * *